United States Patent
Do (10) Patent No.: US 9,013,079 B2
(45) Date of Patent: Apr. 21, 2015

(54) PERMANENT MAGNET GENERATOR FOR STABILIZING ELECTROMOTIVE FORCE

(76) Inventor: Tae whan Do, Daejeon (KR)

(*) Notice: Subject to any disclaimer, the term of this patent is extended or adjusted under 35 U.S.C. 154(b) by 368 days.

(21) Appl. No.: 13/635,388

(22) PCT Filed: Feb. 15, 2011

(86) PCT No.: PCT/KR2011/000983
§ 371 (c)(1),
(2), (4) Date: Sep. 14, 2012

(87) PCT Pub. No.: WO2011/115367
PCT Pub. Date: Sep. 22, 2011

(65) Prior Publication Data
US 2013/0009507 A1    Jan. 10, 2013

(30) Foreign Application Priority Data
Mar. 15, 2010  (KR) .................. 10-2010-0022770

(51) Int. Cl.
H02K 21/02    (2006.01)
H02K 1/24     (2006.01)
H02K 1/22     (2006.01)

(52) U.S. Cl.
CPC ............ *H02K 21/024* (2013.01); *H02K 21/023* (2013.01); *H02K 1/243* (2013.01); *H02K 1/226* (2013.01)

(58) Field of Classification Search
CPC . H02K 21/023; H02K 21/024; H02K 21/048; H02K 1/226; H02K 1/243; H02K 1/27
USPC .................. 310/68 E, 191, 209, 263, 156.24; 290/1 R, 4 R, 44, 55
See application file for complete search history.

(56) References Cited

U.S. PATENT DOCUMENTS 4,920,295 A * 4/1990 Holden et al. ................ 310/209

FOREIGN PATENT DOCUMENTS

| JP | 07-087694 A | 3/1995 |
| JP | 07-236259 A | 9/1995 |
| JP | 2002-345220 A | 11/2002 |
| JP | 2003-244893 A | 8/2003 |

OTHER PUBLICATIONS

Ishihashi (JP 54-175511 U)(1979)English Translation.*
International Search Report for PCT/KR2011/000983 filed on Feb. 15, 2011.

* cited by examiner

*Primary Examiner* — Quyen Leung
*Assistant Examiner* — Robert E Mates (57) ABSTRACT

The present invention relates to a permanent magnet generator for outputting a stabilized electromotive force. More specifically, the permanent magnet generator for stabilizing an electromotive force outputs an electromotive force stably according to the rotation speed of a motor and stabilizes the wave form of the electromotive force to be close to sine waves.

6 Claims, 5 Drawing Sheets

PERMANENT MAGNET GENERATOR FOR STABILIZING ELECTROMOTIVE FORCE

TECHNICAL FIELD

The present invention relates to a permanent magnet generator for outputting a stabilized electromotive force, and more particularly, to a permanent generator for outputting an electromotive force stably in response to a revolution speed of a prime mover and for stabilizing the waveform of the electromotive force to be close to a sine wave.

BACKGROUND ART

A generator is axially coupled to a prime mover that converts a natural energy, such as wind power, water power and nuclear power, into a mechanical energy so as to convert the mechanical energy of the prime mover into an electric energy. The generator is configured in such a manner that rotating magnetic fluxes of a rotator, which is axially coupled to the prime mover, are linked to a stator, which is fixed to the outer circumferential surface of the rotator with a gap, thereby generating an electromotive force.

A small generator is configured in such a manner that permanent magnets are mounted on a rotator in place of a field winding to link rotating magnetic fluxes to an armature winding wound on a stator. Conventionally, N-pole and S-pole permanent magnets are alternately arranged along the outer circumferential surface of the rotator, so that processes of linking the armature winding to an N-pole and then to an S-pole may be repeated to generate an electromotive force close to a sine wave.

However, in a conventional generator, the N-poles form boundaries with the S-poles along an axial direction, and a space exists at each of the boundary parts, which causes the magnetic fluxes linked between the N-poles and S-poles to be abruptly fluctuated. As a result, an electromotive force induced thereby is distorted rather than being formed in a sine wave form. To this end, the induced electromotive force, which is not formed in a sine wave form, contains a lot of harmonic wave components, and causes a problem in that the harmonic wave components contained in the electromotive force result in copper loss in the armature winding, thereby decreasing electricity generating efficiency and adversely affecting a load device which is supplied with the induced electromotive force. That is, a part of energy, which should be converted into the electromotive force with a desired sine wave form, is converted into harmonic components that merely decrease electricity generating efficiency and have a detrimental effect.

In addition, when the coil of the armature winding passes while being opposed to a magnetic pole (N-pole or S-pole), it is impossible to generate an electromotive force with a sine wave form since linkage to the coil is made with uniform fluxes throughout the passage.

That is, when a flux distribution by magnetic poles in the conventional generator is shown along a cylindrical surface, the distribution is close to a square wave where magnetic fluxes are abruptly fluctuated at empty spaces between magnetic poles. Therefore, there is a problem in that the induced electromotive force cannot be formed in a sine wave form.

In order to solve this problem, the prior art obtains an electromotive force close to a sine wave form by distributing a plurality of windings around the stator and connecting the windings in serial. However, this winding method is too complicated to be applied to a small generator.

Meanwhile, since an induced electromotive force is fluctuated depending on the revolution speed of a rotator, the prior art employs a method for keeping the revolution speed of a prime mover axially coupled to the rotator constant in order to generate a predetermined electromotive force.

However, providing a control means for keeping the revolution speed of the prime mover is difficult to employ since providing such a control means in a small generator, which uses wind power or water power, is uneconomic in view of securing the costs and spaces for installing the generator. As such, the control means has not been employed, and an arrangement configured to release the axial coupling with the prime mover has been used in place of the control means in order to prevent excessive power generating. However, this makes it difficult to utilize wind power or water power properly, thereby decreasing generating efficiency.

DETAILED DESCRIPTION OF THE INVENTION

Technical Problem

An object of the present invention is to provide a permanent magnet generator for stabilizing an electromotive force, which is configured in such a manner that an induced electromotive force generated in an armature winding of a stator may be formed close to a sine wave form by allowing magnetic fluxes by the magnetic poles of a rotator to be continuously connected without being cut.

Another object of the present invention is to provide a permanent magnet generator for stabilizing an electromotive force, which is configured to generate an electromotive force in a predetermined range even when the rotating force transmitted from a prime mover is fluctuated, by adding a simple arrangement.

Technical Solution

In accordance with an aspect of the present invention, there is provided a permanent magnet generator for stabilizing an electromotive force including: a case 100 provided with a stator 110 on the inner circumferential surface thereof, the stator 110 being wound with an armature winding; and a rotator 200 provided with permanent magnets, the rotator 200 being fixed to a rotation shaft 210 rotated by a prime mover and mounted in the inside of the case 100. The rotator includes: a fixed rotor 220 having a plurality of first one-pole permanent magnets 221 with the same polarity, wherein each of the first one-pole permanent magnets is formed to widen as approaching to the rear end from a pointed peak at the front end thereof and to have a length corresponding to the axial length of the stator 110, and then the first one-pole permanent magnets 220 are fixedly arranged around the outer circumferential surface of the rotation shaft 210; and a centrifugal rotor 230 having a plurality of second one-pole permanent magnets 231 formed in the same shape as the one-pole permanent magnets 221 and with the same polarity which is different from that of the first one-pole permanent magnets 221, wherein the second one-pole permanent magnets 231 are fixedly arranged around the outer circumferential surface of the centrifugal rotator 230 in a state in which the pointed peaks are directed rearward, so that the first one-pole permanent magnets 221 and the second one-pole permanent magnets 231 are engaged with each other with a spacing d. The centrifugal rotator further includes a guide tube 213 configured to be fitted on the rotation shaft 210, in which a guide protrusion 213 in a shape of an elongated protrusion extending in the axial direction is formed on the outer circumferential surface of the rotation shaft 210, and an elongated guide recess 236 in a shape of an elongated recess extending in the axial direction is formed on the inner circumferential surface of the guide tube 233 such that the guide protrusion 213 is inserted into the elongated guide recess 236 and guided in the axial direction of the rotation shaft 210 to be capable of being moved to and fro.

Each of the first one-pole permanent magnets 221 and the second one-pole permanent magnets 231 may be formed in an equilateral triangle shape when they are spread on a plane.

The rotation shaft 210 may be provided with a centrifugally movable unit 300; 300' at the front end thereof which makes the rotation shaft 210 move forward as the revolution speed of the rotation shaft 210 is increased. As a result, as the revolution speed of the rotation shaft 210 is increased, the centrifugal rotator may gradually escape from the inside of the stator 110.

In addition, the rotation shaft 210 may be formed in a shape of a hollow tube provided with a guide hole 211 along the axial direction, a reciprocating shaft 240, which is provided with a compression disc 241 at the front end thereof, may be inserted into an axial bore 212 of the rotation shaft 210, then an anchoring pin 234 may be inserted through the guide hole 211 to fix the centrifugal rotator 230 to the rear end of the reciprocating shaft 240. The centrifugally movable unit 300; 300' may move the compression disc 241 to and fro along the axial direction.

The compression disc 241 provided at the front end of the reciprocating shaft 240 may be elastically supported by a tension elastic body 242, or the rear end of the reciprocating shaft 240 may be elastically supported at the rear side by a tension elastic body 242A or a compression elastic body 242B inserted into the axial bore 212 of the rotation shaft 210. The centrifugally movable unit 300 may include: an abutment 310 fixed to the front side outer circumferential surface of the rotation shaft 210; and a centrifugal pivot bar 320 formed in a bent bar shape, the bent portion being hinged 322 to an end of the abutment 310 in a state in which the bent inner side is positioned to be directed to the axial direction of the rotation shaft 210 and the rear end of the centrifugal pivot bar 320 is engaged with the rear surface of the compression disc 241.

The centrifugally movable unit 300' may include: a revolution counter 330 configured to sense the revolution speed (RPM) of the rotation shaft (240); and a compression disc movement control unit (340) configured to move the compression disc (241) to and fro in accordance with the sensed revolution speed.

Advantageous Effects

In accordance with the present invention constructed as described above, N-pole magnets and S-pole magnets provided on a rotator are arranged to be engaged with each other with a predetermined spacing so that magnetic fluxes linked to an armature winding may be continuously connected without being cut. As a result, an electromotive force may be induced to be close to a sine wave form, thereby increasing electricity generating efficiency.

In addition, in accordance with the present invention, linkage magnetic fluxes by any of N-pole magnets or S-pole magnets (e.g., the second permanent magnets) may be increased or reduced depending on a magnitude of rotatory power of a prime mover to supply an electromotive force with a value of a predetermined range even if the rotatory power of the prime mover is fluctuated. As a result, it is possible to suppress the damage of the armature winding and a load device.

Furthermore, in accordance with the present invention, the reciprocating shaft 240 is configured to be rotated with the rotation shaft 210, and to be inserted into the axial bore of the rotation shaft 210 to be axially guided, thereby being fixed to the centrifugal rotator 230. As a result, an arrangement for moving the centrifugal rotator 230 can be simply mounted at an end of the reciprocating shaft 240.

REFERENCE NUMERALS FOR MAIN ELEMENTS IN THE DRAWINGS

100: case 110: stator 120: front cover
121: centrifugal rotator reception part
122: bearing 123: axial through-hole
124: flange 125: bolt 130: back plate
131: bearing 132: axial through-hole
200: rotator 210: rotation shaft 211: guide hole
212: axial bore 213: guide protrusion
220: fixed rotator
221: first one-pole permanent magnet
222: first magnet holding tube
230: centrifugal rotator
231: second one-pole permanent magnet
232: second magnet holding tube
233: guide tube 234: anchoring pin
235: pin insertion hole 236: guide recess
240: reciprocating shaft 241: compression disc
242: elastic body 243: fastening nut
244: through-hole 300: centrifugation moving unit
310: abutment 311: cylindrical tube
312: deflection preventing protrusion
320: centrifugal rotating bar
321: hook piece 322: hinge
330: revolution counter
340: compression disc movement control unit

MODE FOR CARRYING OUT THE INVENTION

Various exemplary embodiments are now described with reference to the drawings in such a manner that a person skilled in the art can readily practice the present invention. It shall be noted that the same elements will be designated by the same reference numerals if possible even if they are shown in different drawings. Further, in the following description of the present invention, a detailed description of related known functions and configurations incorporated herein will be omitted when it may make the subject matter of the present invention rather unclear.

Figure 1:
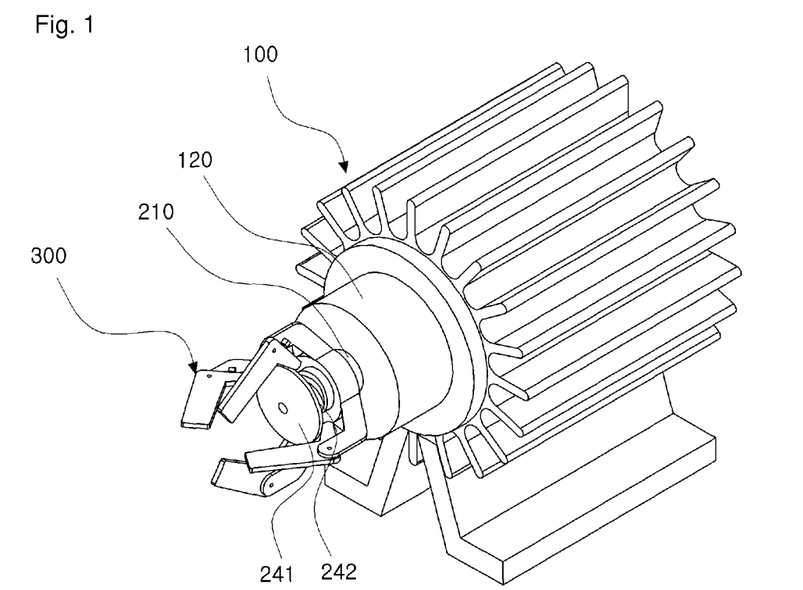
FIG. 1 shows a perspective view of a permanent magnet generator for stabilizing an electromotive force in accordance with a first exemplary embodiment of the present invention.

FIG. 1 is a perspective view of a permanent magnet generator for stabilizing an electromotive force in accordance with a first exemplary embodiment of the present invention.

Referring to FIG. 1, the generator in accordance with the first exemplary embodiment of the present invention includes a case 100 configured to generate an electromotive force by electromagnetic induction caused between a stator and a rotator, and is configured such that a rotation shaft 210 of the rotator axially extends through the case 100, a prime mover (not shown) is fixed to the rear end of the rotation shaft 210 so that rotatory power is transmitted to the rotation shaft 210, and a centrifugally movable unit 300 is mounted at the front end of the rotation shaft 210 so that an induced electromotive force can be increased or decreased depending on the magnitude of the rotatory power.

Here, the prime mover (not shown) may be configured to be suitable for a method of obtaining driving force: when the present invention is applied to a wind power generator, the prime mover may be constituted with a fan blade assembly, and when the present invention is applied to a water power generator, the prime mover may be constituted with a waterwheel.

Now, the detailed elements in accordance with the first exemplary embodiment of the present invention will be described in detail with reference to FIGS. 2 to 4.

Figure 2:
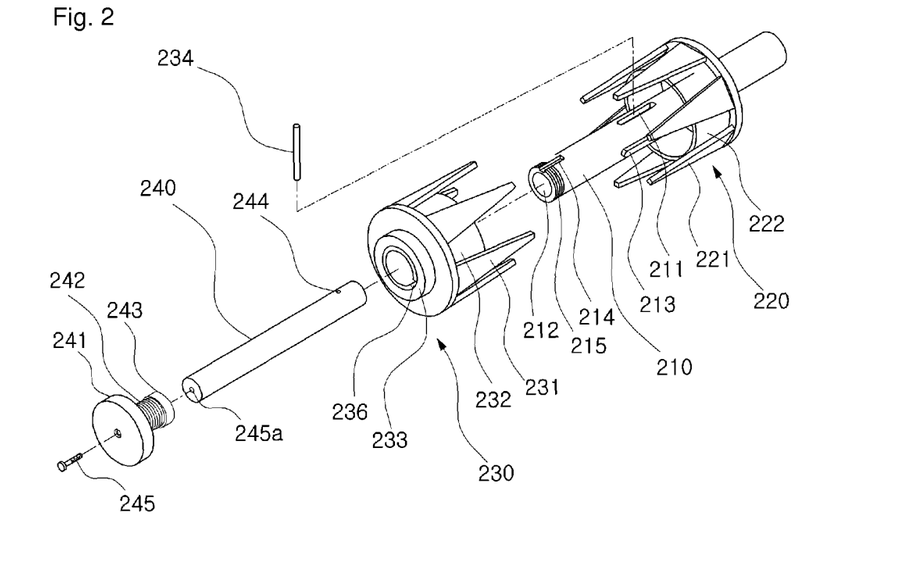
FIG. 2 shows an exploded perspective view of a rotator 200 in the first exemplary embodiment of the present invention.

FIG. 2 is an exploded perspective view of a rotator 200 in the first exemplary embodiment of the present invention.

Figure 3:
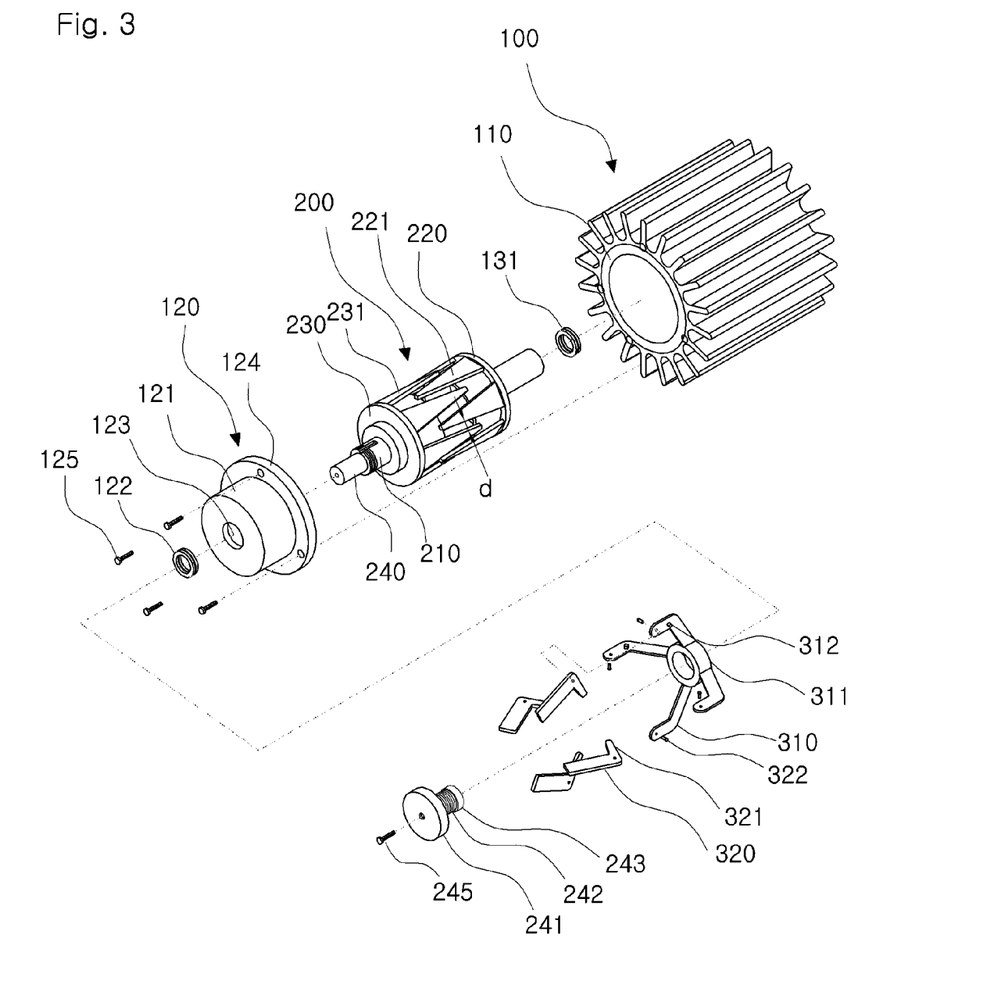
FIG. 3 shows an exploded perspective view of the permanent magnet generator for stabilizing an electromotive force in accordance with the first exemplary embodiment of the present invention.

FIG. 3 is an exploded perspective view of the permanent magnet generator for stabilizing an electromotive force in accordance with the first exemplary embodiment of the present invention.

Figure 4:
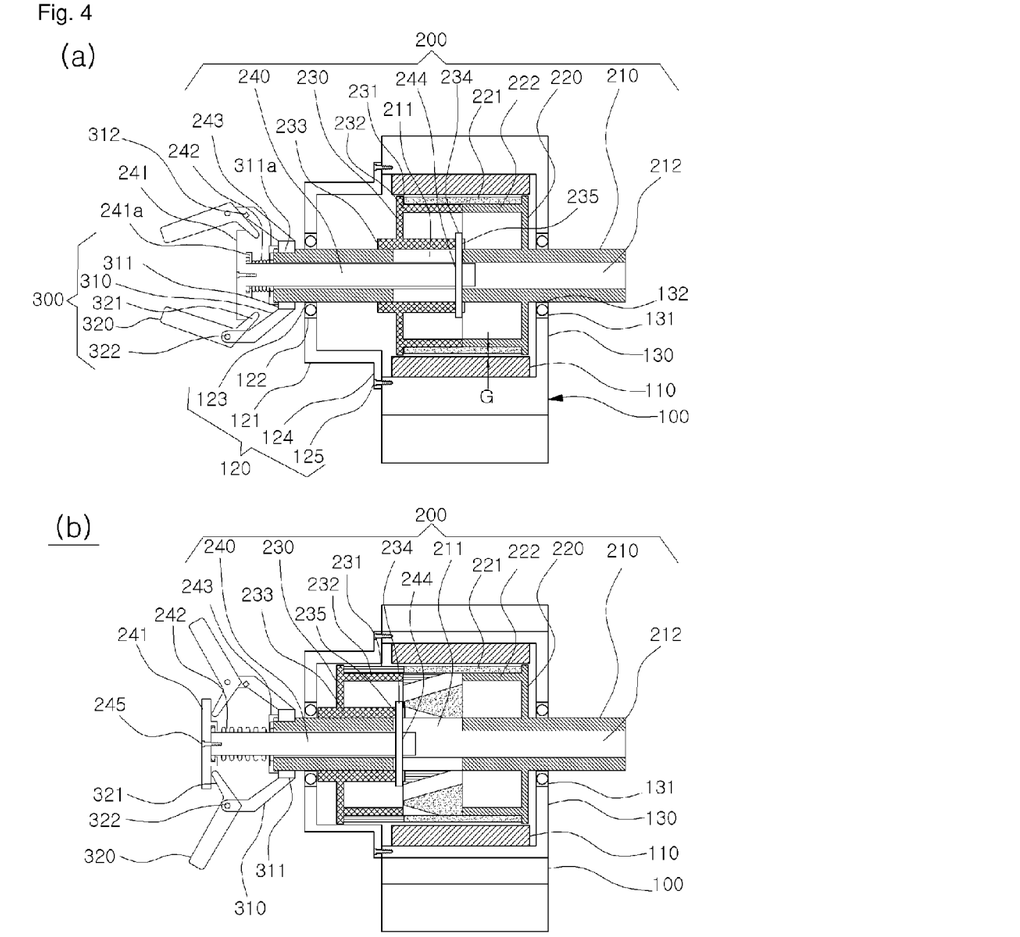
FIG. 4 shows cross-sectional side views of the permanent magnet generator for stabilizing an electromotive force in accordance with the first exemplary embodiment of the present invention.

FIG. 4 shows cross-sectional side views of the permanent magnet generator for stabilizing an electromotive force in accordance with the first exemplary embodiment of the present invention, in which FIG. 4a illustrates the permanent magnet generator prior to moving the centrifugal rotator 230, and FIG. 4b illustrates the permanent magnet generator after having moved the centrifugal rotator 230.

Referring to FIGS. 2 to 4, the present invention includes: a case 100 provided with a stator 110 on the inner circumferential surface thereof; a rotator 200 including a plurality of permanent magnets 221 and 231, and rotatably mounted in the inside of the case 100; and a centrifugally movable unit 300 mounted at the front end of the rotator 200.

The case 100 has a cylindrical body, and the stator 110 wound with an armature winding is fixed circumferentially along the inner circumferential surface of the case 100. The rear side of the case 100 is configured to be closed by a back plate 130 which is formed with an axial through-hole 132 at the center thereof, and the front side of the case 100 is configured to be closed by a front cover 120 which is formed with an axial through-hole 123 at the center thereof.

Here, the front cover 120 is provided with a cylindrical centrifugal rotator reception part 121 in order to provide a free space for allowing a centrifugal rotator 230 to be moved in the direction of rotation axis, in which the centrifugal rotator 230 will be described later. A flange 124 is formed on the rear side outer periphery of the centrifugal rotator reception part 121 and is fixed to the front side of the body of the case 100 by bolts 125. The front side of the centrifugal rotator reception part 121 is closed by a plate formed with the axial through-hole 123 at the center thereof.

In addition, bearings 122 and 131 are fitted in the axial through-holes 123 and 132, respectively, so that the rotation shaft 210 of the rotator 200 extends through the bearings 122 and 131 to be rotatably supported in the case 100, in which the rotator 200 will be described later.

The stator 110 is wound with an armature coil which is arranged to link to the magnetic fluxes of permanent magnets 221 and 231, so that when the permanent magnets 221 and 231 are rotated about the rotation shaft 210, an electromotive force is generated by linked magnetic fluxes and supplied to the outside, in which the permanent magnets 221 and 231 will be described later.

The rotator 200 includes a rotation shaft 210 that serves as a rotation axis, a fixed rotator 220 fixed to the rotation shaft 210, and a centrifugal rotator 230 mounted on the rotation shaft 210 to be capable of reciprocating in the direction of rotation axis.

The rotation shaft 210 is formed in a shape of hollow tube. When the rotation shaft 210 is received within the case 100, the rear side extends through the bearing 131 of the back plate 130 of the case 100, and the front side extends through the bearing 122 of the front cover 120 of the case 100 to be rotatably supported by the bearings 131 and 122. In addition, on the rotation shaft 210, an elongated guide hole 211 and an elongated guide protrusion 213 are formed along the axial direction at a portion corresponding to the moving range of the centrifugal rotator 230, an elongated recess 214 is formed at the front portion, and male threads 215 are formed at the periphery of the front end portion.

The fixed rotator 220 includes: a first magnet holding tube 222 formed in a cylindrical shape having a diameter larger than the outer diameter of the rotation shaft 210 and fixed to the rotation shaft 210 in a state in which the first magnet holding tube 222 is fitted on the rotation shaft 210; a plurality of first one-pole permanent magnets 221 having the same polarity, each of the first one-pole permanent magnets 221 being formed to have a pointed peak at the front end thereof and to gradually widen as approaching to the rear end thereof, in which the first one-pole permanent magnets 221 are fixedly arranged around the outer periphery of the first magnet holding tube 222 like a series of saw teeth when the first one-pole permanent magnets 221 are viewed along the circumferential direction of the first magnet holding tube 222.

Thus, the first one-pole permanent magnets 221 are arranged to be opposed to the stator 110 with a gap G being formed between the first one-pole permanent magnets 221 and the stator 110. When the first one-pole permanent magnets 221 are spread on a plane, each of the first one-pole permanent magnets 221 is formed in a shape of an equilateral triangle such that a pointed peak of the equilateral triangle shape is positioned at the front end of the permanent magnet and the bottom side of the equilateral triangle shape is positioned at the rear end of the permanent magnet. At this time, the axial length of the first magnet holding tube 222 is smaller than a half of the axial length of the first one-pole permanent magnets 221 so that a plurality of second one-pole permanent magnets 231 can be positioned close to and engaged with the first one-pole magnets 221 even if a second magnet holding tube 232 approaches to the first magnet holding tube 222, in which the second one-pole magnets 231 and the second magnet holding tube 232 will be described later.

Here, the axial length of the first one-pole permanent magnets 221 is determined to be suitable for the axial length of the stator. With reference to the equilateral triangle, the height of the equilateral triangle is determined to be suitable for the axial length of the stator. Thus, when the second one-pole permanent magnets 221 described later are moved forward to be further spaced away from the first one-pole permanent magnets 221, the magnet fluxes linked by the second one-pole permanent magnets 221 are reduced.

The centrifugal rotator 230 includes: a second magnet holding tube 232 formed in the same shape with the first magnet holding tube 222 and fitted on the rotation shaft 210 to be biased to the front as compared to the first magnet holding tube 222; a plurality of second one-pole permanent magnets 231 having a polarity different from that of the first one-pole permanent magnets 221, each of the second one-pole permanent magnets 231 is formed in a shape which is the same with that of each of the first one-pole permanent magnets 221, in which the first one-pole permanent magnets 221 are fixedly arranged around the outer periphery of the first magnet holding tube 222 such that the pointed peaks of the second one-pole permanent magnets 232 are oriented to the rear side; and a guide tube 233 snugly fitted on the rotation shaft 210 corresponding to the inside portion of the second magnet holding tube 232 to be capable of being reciprocated by being guided along the axial direction of the rotation shaft 210, the guide tube 233 being fixed to the second magnet holding tube 232.

Specifically, when the first one-pole permanent magnets 221 are formed to have an N-pole outer circumferential surface, the second one-pole permanent magnets 231 are formed to have an S-pole circumferential surface, and when the second magnet holding tube 232 is formed to be the same with the first magnet holding tube 222 and the first and second magnet holding tubes 222 and 232 are moved adjacent to each other, the second one-pole permanent magnets 231 are engaged with the first one-pole permanent magnets 221 with a spacing d being formed therebetween, in which the spacing d is determined depending on the moving distance of the centrifugal rotator 230.

Here, the centrifugal rotator 230 is configured to be rotated together with the fixed rotator 220 as the rotation shaft 210 is rotated, and to be capable of being moved along the axial direction of the rotation shaft 210. For this purpose, the exemplary embodiment of the present invention forms an elongated guide recess 236 on the inner circumferential surface of the guide tube 233 to be fitted on the guide protrusion 213 of the rotation shaft 210 such that the centrifugal rotator 230 is guided along the rotation shaft 210 to be moved axially, and rotated in the same direction with the rotation shaft 210 when the rotation shaft 210 is rotated since the guide protrusion 213 keeps its state fitted in the elongated guide recess 236.

In addition, the centrifugal rotator 230 is rigidly fixed to a reciprocating shaft 240 which is fitted in an inside bore 212 of the rotation shaft 210.

The reciprocating shaft 240 is formed in a rod shape and provided with a compression disc 241 at the front end thereof and with a through-hole 244 extending vertically, in which the reciprocating shaft 240 is fitted in the inside bore 212 of the rotation shaft 210. Here, the reciprocating shaft 240 is mounted in such a manner that even when the reciprocating shaft 240 is reciprocated, the compression disc 241 is kept in the state of being exposed to the front side, and the through-hole 244 does not get out of the range of the guide hole 211 formed in the rotation shaft 210. That is, a pin insertion hole 235 is formed in the guide tube 232 of the centrifugal rotator 230, and an anchoring pin 234 is inserted into the pin insertion hole 235, the guide hole 211 and the through-hole 244 so that the centrifugal rotator 230 can be moved along the guide hole 211 in the state the centrifugal rotator 230 is fixed to the reciprocating shaft 240. At this time, since the anchoring pin 234 is also inserted into the guide hole 211, the centrifugal rotator 230 is movable only within the range of the guide hole 211.

Meanwhile, the compression disc 241 is elastically supported to the front end of the rotation shaft 210 by a tensioned elastic body 242 to be pulled rearward. In the present exemplary embodiment, the elastic body 242 is constituted with a tension spring, one end of which is fixed to the rear surface of the compression disc 241 and the other end 241a of which is fixed to the front end of the rotation shaft 210 by a fastening nut 243. Here, the fastening nut 243 is also configured to fix a cylindrical tube 311 of the centrifugally movable unit 300, which will be described later. In addition, in order to install the centrifugally movable unit 300 to be described later at the front end of the rotation shaft 210, the compression disc 241 is fabricated separately from the reciprocating shaft 240, and when coupling the centrifugally movable unit 300, the compression disc 241 is configured to be fixed to the front end of the reciprocating shaft 240 by a bolt (see reference numerals 245 and 245a).

The centrifugally movable unit 300 includes: a plurality of abutments 310 inclinedly extending from the cylindrical tube 311 in the form of plural branches, the cylindrical tube 311 being fitted on the front end portion of the rotation shaft 210; and a plurality of centrifugal pivot bars 320, each of which is formed in a bent bar shape, the centrifugal pivot bars 320 being hinged to the ends of the abutments 310 (see reference numeral 322) at the bent parts, respectively, in the state in which the bent inner surfaces are arranged to face the axial direction of the rotation shat 210.

Here, the abutments 310 are arranged along the outer circumferential surface of the cylindrical tube 311 to be gradually spread out as approaching to the front ends thereof.

The centrifugal pivot bars 320 are configured such that the centrifugal pivot bars 320 extend substantially toward the front side when the rotation shaft 210 is not rotated, and the rear end of each of the centrifugal pivot bars 320 is formed with a hook piece 321 bent toward the rotation shaft 210, in which the hook pieces 321 are hooked to the rear surface of the compression disc 241. The abutments 310 are respectively provided with deflection prevention protrusions 312 configured to be hooked to the hook pieces 321 respectively to prevent the centrifugal pivot bars 320 from being deflected downward.

Meanwhile, an elongated protrusion 311a is formed along the axial direction on the inner circumferential surface of the cylindrical tube 311, and an elongated recess 214 is formed on the rotation shaft 210 to be fitted on the elongated protrusion 311a, so that when the rotation shaft 210 is rotated, the centrifugally movable unit 300 can be also rotated as the elongated protrusion 311a and the elongated recess 214 are coupled to each other.

Now, the fluctuation of a generated electromotive force by the operation of the centrifugally movable unit 300 in the first exemplary embodiment of the present invention constructed as described above will be discussed.

When the rotation shaft 210 is rotated by the rotatory power of a prime mover (not shown), the centrifugal pivot bars 320 are also rotated to receive centrifugal force. As such, the centrifugal pivot bars 320 are spread out in such a manner that the front ends of the centrifugal pivot bars 320 are spaced away from one another. To this end, the hook pieces 321 push the compression disc 241 to the front side.

As a result, due to the forward movement of the compression disc 241, the centrifugal rotator 230 is also moved toward the front side. As such, the spacing d between the first one-pole permanent magnets 211 and the second one-pole permanent magnets 231 is further increased, and the second one-pole permanent magnets 231, which have been positioned in the form of being fitted in the stator 110, gradually escape from the second one-pole permanent magnets 231 such that the second one-pole permanent magnets 231 fixed to the centrifugal rotator 230 escape out from the stator 110. This will reduce the amount of magnetic fluxes linked to the stator 110 by the second one-pole permanent magnets 231, thereby lowering the electromotive force generated by the stator.

That is, the present invention increases linked magnetic fluxes when the rotatory power of a prime mover (not shown) is low, and reduces linked magnetic fluxes when the rotatory power is high, so that the electromotive force generated by the stator can be maintained substantially constantly without suffering from substantial fluctuation.

Referring to an action of a conventional generator, when rotatory power from a prime mover is severely fluctuated as in a wind power generator although the electromotive force for operating a load device (not shown) is constant, it is unavoidable that the electromotive force generated thereby is severely fluctuated since the rotatory power is largely fluctuated depending on the intensity of wind power. As such, it may bring about a concern of damaging an electric part due to excessive power generation. However, the present invention can dispel such a concern by keeping the electromotive force constant in response to rotatory power.

Figure 5:
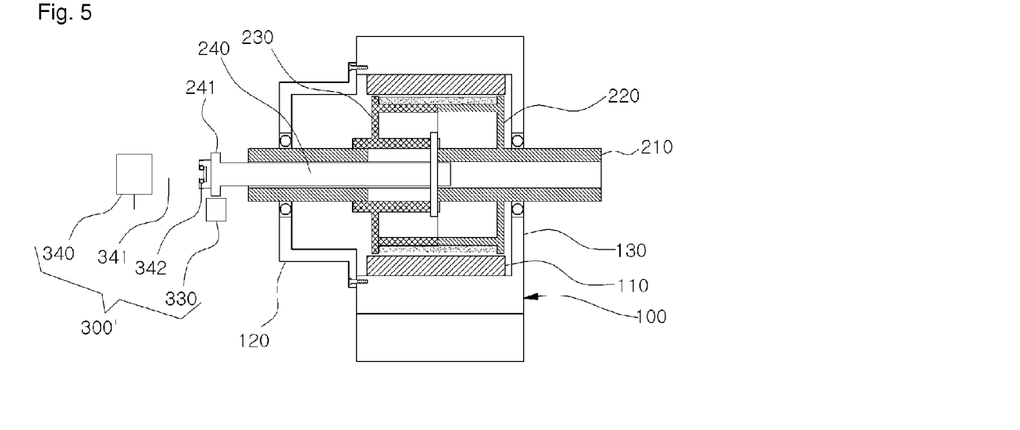
FIG. 5 shows a cross-sectional side view of a permanent magnet generator for stabilizing an electromotive force in accordance with a second exemplary embodiment of the present invention.

FIG. 5 is a cross-sectional side view of a permanent magnet generator for stabilizing an electromotive force in accordance with a second exemplary embodiment of the present invention.

In accordance with the second exemplary embodiment illustrated in FIG. 5, a centrifugally movable unit 300' is constituted with a revolution counter 330 and a compression disc movement control unit 340, and is not provided with an elastic body 242 in the first exemplary embodiment 242.

Here, the revolution counter 330 measures the revolution speed value of the rotation shaft 210 by sensing the revolution speed (RPM) of the compression disc 241.

In addition, the compression disc movement control unit 340 moves the compression disc 241 forward or rearward in the direction of rotation axis. For this purpose, a bearing 342 is provided in front of the compression disc 241 to rotatably connect the compression disc 241 to a rod 341, and the compression disc movement control unit 340 is configured to push or pull the rod 341 in the direction of rotation axis.

That is, the compression disc movement control unit 340 is configured such that when the revolution speed value is increased, the compression disc movement control unit 340 pulls the rod 341, and when the revolution speed value is reduced, the compression disc movement control unit 340 pushes the rod 341, thereby moving the compression disc 241 forward or rearward in the direction of rotation axis. The compression disc movement control unit 340 may be constituted with a hydraulic machine configured such that the load 341 is connected to the inside of a cylinder (not shown) to be moved forward or rearward by a hydraulic motor (not shown) or with a stepping motor (not shown) which can move the rod 341 forward or rearward. However, the present invention is not limited to the hydraulic machine or the stepping motor.

As constructed as described above, the second exemplary embodiment of the present invention can control the moving amount of the compression disc 241 precisely in accordance with a revolution speed value more precisely than the first exemplary embodiment that moves the compression disc 241 with the elastic body 242 and the centrifugally movable unit 300 although the second exemplary embodiment of the present invention consumes electric power since it employs the compression disc movement control unit 340 which is a power unit.

Figure 6:
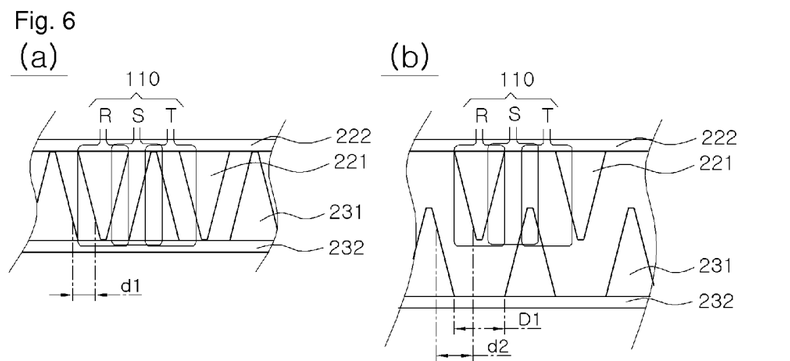
FIG. 6 illustrates permanent magnets provided in a rotator in accordance with an exemplary embodiment in a state in which the permanent magnets are spread on a plane.

FIG. 6 illustrates permanent magnets provided in a rotator in accordance with the exemplary embodiments of the present invention in a state in which the permanent magnets are spread on a plane. In FIG. 6, the winding of the stator 110 is formed as 3-phase windings. For the convenience, one 3-phase pair (R, S, T) is illustrated. Here, FIG. 6a illustrates a state in which the revolution speed of the rotation shaft 210 is low, and FIG. 6b illustrates a state in which the revolution speed of the rotation shaft 210 is high.

Referring to FIG. 6, a plurality of first one-pole permanent magnets 221 are arranged on the first magnet holding tube 222 with a spacing D1, and a plurality of second one-pole permanent magnets 231 are arranged on the second magnet holding tube 232 with a spacing D1. The first one-pole permanent magnets have the same polarity and the second one-pole permanent magnets have the same polarity. The polarity of the first one-pole permanent magnets is different from that of the second one-pole magnets. Before the second magnet holding tube 232 is moved, the first one-pole permanent magnets 221 and the second one-pole permanent magnets 231 are engaged with each other in a tooth meshing form with a spacing d1 (FIG. 6a). Here, the spacing D1 between the permanent magnets 221 and 231 is determined to be equal to the base side of each of the permanent magnets 221 and 231.

When the rotator 200 is rotated to rotate the first one-pole permanent magnets 221 and the second one-pole permanent magnets 231, the entire magnetic fluxes of the first one-pole permanent magnets 221 and the second one-pole permanent magnets 231 are linked to the first one-pole permanent magnets 221 and the second one-pole permanent magnets 231 are linked to the windings (R, S, T) of the stator 100. At this time, for the magnetic fluxes linked when each of the winding (R, S, T) coils passes, the fluxes of the second one-pole permanent magnets 231 are reduced while the fluxes of the first one-pole permanent magnets 221 are increased, or the fluxes of the permanent magnets 231 are also reduced while the fluxes of the permanent magnets 221 are reduced. In addition, between the first one-pole permanent magnets 221 and the second one-pole permanent magnets 231, flux linkage by the second one-pole permanent magnets 231 is implemented simultaneously when the flux linkage by the first one-pole permanent magnets 221 is terminated.

In the prior art, the magnetic poles are formed in a rectangular shape. As such, since the magnetic fluxes are abruptly fluctuated at a transition from one pole to the other pole, the waveform of an electromotive force induced in the windings (R, S, T) is not formed as a sine wave. However, in accordance with the present invention, since a continuous change of magnetic fluxes is formed at the transition from a first one-pole permanent magnet 221 to a second one-pole permanent magnet 231, the wave form of an induced electromotive force is formed close to a sine wave. To this end, the present invention can minimize the harmonic wave components as compared to the prior art, which makes it possible to reduce the power loss by the harmonic wave components.

FIG. 6b illustrates a state in which the centrifugal rotator 230 is spaced away from the fixed rotator 220 as the revolution speed of the rotation shaft 210 is increased, in which since the spacing d2 between the magnetic poles is increased as compared to the spacing d1 in FIG. 6a, and hence the linkage fluxes by the second one-pole permanent magnets 231 are reduced, an induced electromotive force is reduced. As such, even if the revolution speed is fluctuated, the magnitude of induced electromotive force can be substantially maintained. Even in this case, although a spaced part may occur between the first one-pole permanent magnets and the second one-pole permanent magnets, the magnetic fluxes linked to a coil can be maintained by the first one-pole permanent magnets 221 in a desirable waveform as compared to the prior art.

Figure 7:
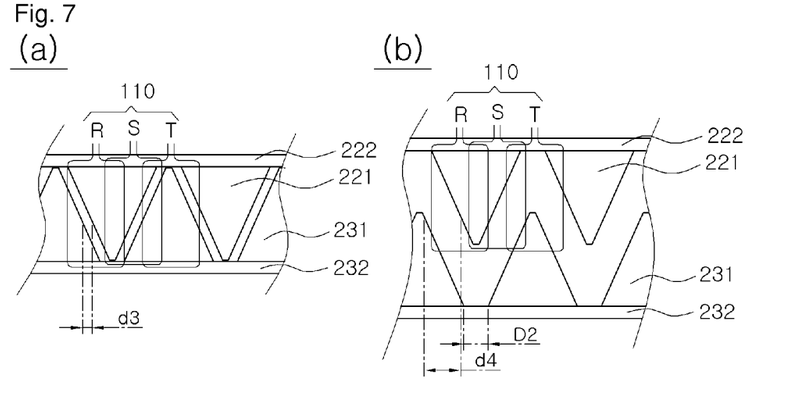
FIG. 7 illustrates permanent magnets arranged with different spacings in the exemplary embodiments in a state in which the permanent magnets are spread on a plane.

FIG. 7 illustrates permanent magnets arranged with a narrow spacing in the exemplary embodiments in a state in which the permanent magnets are spread on a plane. Here, FIG. 7a illustrates a state in which the revolution speed of the rotation shaft 210 is low, and FIG. 7b illustrates a state in which the revolution speed is high.

That the spacing D2 between the first one-pole permanent magnets 221 arranged in the form of saw teeth is set to be smaller than the spacing D1 in the exemplary embodiment in FIG. 6, and the spacing D2 of the second one-pole permanent magnets 231 are set to be equal to the spacing D2 of the first one pole magnets such that the spacing d3 between the first one-pole permanent magnets 221 and the second one-pole permanent magnets 231 is smaller than that of the exemplary embodiment of FIG. 6.

Thus, since magnetic fluxes applied to a coil by one magnetic pole are formed in the spacing D2 which is set further smaller than FIG. 6, it is possible to supply an electromotive force more stabilized than the exemplary embodiment of FIG. 6. Furthermore, assuming the revolution speed is increased to be the same with the state as illustrated in FIG. 7b, a coil is continuously connected without being cut when it crosses from a first one-pole permanent magnet 221 to a second one-pole permanent magnet 231.

Meanwhile, the maximum moving distance of the second one-pole permanent magnets 231 is set to be smaller than the axial length of the second one-pole permanent magnets 231 such that flux linkage can be executed by the stator even if the second one-pole permanent magnets 231 are moved at the maximum thereof. In the present exemplary embodiment, the maxim moving distance of the second one-pole permanent magnets 231 is set to about ⅔ of the axial length of the second one-pole permanent magnets 231, and such a moving distance may be set by adjusting the length of the guide hole 211 formed in the rotation shaft 210.

Figure 8:
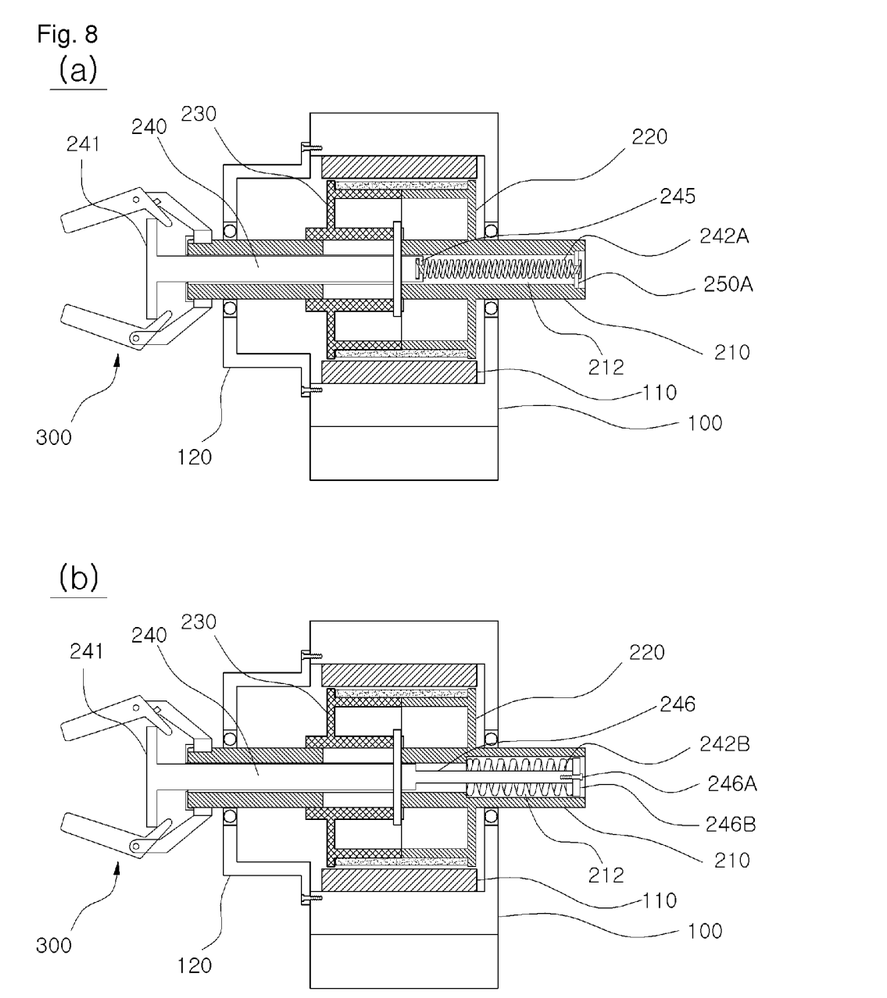
FIG. 8 illustrates that an elastic body may be mounted in the rear side of a rotation shaft 210 in the first exemplary embodiment of the present invention.

FIG. 8 illustrates that an elastic body may be mounted in the rear side of a rotation shaft 210 in the first exemplary embodiment of the present invention.

That is, referring to the exemplary embodiment illustrated in FIG. 8, an elastic body is mounted in a rear side axial bore 212 of the rotation shaft 210 where a prime mover (not shown) is mounted rather than being mounted on the compression disc 241 side of the reciprocating shaft 240.

Specifically, the elastic body 242A in the exemplary embodiment of FIG. 8a is fitted in the axial bore 212 of the rear side of the rotation shaft 210 in such a manner that one end of the elastic body 242A is fixed to the rear end of the reciprocating shaft 240 (see reference numeral 245) and the other end is fixed to the rear end of the rotation shaft 210 (see reference numeral 250A), in which the elastic body 242A is constituted with a tension spring.

In addition, in the exemplary embodiment of FIG. 8b, the rear side part of the axial bore 212 of the rotation shaft 210 is formed to have a diameter larger than the front side part so that the inner circumferential surface of the axial bore 212 is stepped, and then the elastic body 242B is mounted by being inserted into the axial bore 212 so that the front end is caught by the stepped part. In addition, a rod 246 is formed to extend rearward from the rear end of the reciprocating shaft 240, the rod 246 is inserted into an elastic body 242B, and then the rear end of the rod 246 is fixed to the rear end of the elastic body 242B (see reference numerals 246A and 246B). At this time, the elastic body 240 is constituted with a compression spring.

That is, in configuring the reciprocating shaft 240 to receive elastic force directed rearward, although the present invention may provide the elastic body 242 at the front side of the reciprocating shaft 240 as illustrated in FIGS. 1 to 4, it can be seen that the present invention may provide an elastic body 242A or 242B which can be inserted into the axial bore 212 of the rotation shaft 210 as in the exemplary embodiments illustrated in FIG. 8 and mount the elastic body at the rear side of the reciprocating shaft 240.

While the present invention has been illustrated and described in connection with various specific exemplary embodiments in order to exemplify the technical ideas of the present invention, it will be understood that the present invention is not limited to the constructions and actions which are the same with the specific exemplary embodiments as described above, and various modifications can be made without departing from the scope of the present invention. Accordingly, such modifications shall be considered as belonging to the scope of the present invention, which shall be determined on the basis of the accompanying claims.

The invention claimed is:

1. A permanent magnet generator for stabilizing an electromotive force comprising:
   a case (100) provided with a stator (110) on an inner circumferential surface thereof, the stator (110) being wound with an armature winding; and
   a rotator (200) provided with permanent magnets, the rotator (200) being fixed to a rotation shaft (210) rotated by a prime mover and mounted in the inside of the case (100),
   wherein the rotator (200) comprises:
      a fixed rotator (220) including a plurality of first one-pole permanent magnets (221) with the same polarity, wherein each of the first one-pole permanent magnets (221) has a width increasing as approaching to a rear end from a pointed peak at a front end thereof and a length corresponding to an axial length of the stator (110), and the first one-pole permanent magnets (221) are fixedly arranged around an outer circumferential surface of the rotation shaft (210); and
      a centrifugal rotator (230) including a plurality of second one-pole permanent magnets (231) having the same shape as the first one-pole permanent magnets (221), the second one-pole permanent magnets (231) having the same polarity that is different from that of the first one-pole permanent magnets (221), wherein the second one-pole permanent magnets (231) are fixedly arranged around an outer circumferential surface of the centrifugal rotator (230) in a state in which pointed peaks of the second one-pole permanent magnets (231) are directed rearward so that the first one-pole permanent magnets (221) and the second one-pole permanent magnets (231) are engaged with each other with a spacing (d), the centrifugal rotator (230) further comprising a guide tube (233) configured to be fitted on the rotation shaft (210), wherein a guide protrusion (213) in a shape of an elongated protrusion extending in an axial direction is disposed on the outer circumferential surface of the rotation shaft (210), and an elongated guide recess (236) in a shape of an elongated recess extending in the axial direction is disposed on an inner circumferential surface of the guide tube (233) such that the guide protrusion (213) is inserted into the elongated guide recess (236) and guided in the axial direction of the rotation shaft (210) to be capable of being moved to and fro.

2. The permanent magnet generator as claimed in claim 1, wherein each of the first one-pole permanent magnets (221) and the second one-pole permanent magnets (231) has an equilateral triangle shape when they are spread on a plane.

3. The permanent magnet generator as claimed in claim 2, wherein the rotation shaft (210) is provided with a centrifugally movable unit (300; 300') at a front end thereof which makes the rotation shaft (210) move forward as a revolution speed of the rotation shaft (210) is increased, whereby as the revolution speed of the rotation shaft (210) is increased, the centrifugal rotator (230) gradually escapes from the inside of the stator (110).

4. The permanent magnet generator as claimed in claim 3, wherein the rotation shaft (210) has a shape of a hollow tube provided with a guide hole (211) along the axial direction, a reciprocating shaft (240), which is provided with a compression disc (241) at a front end thereof, is inserted into an axial bore (212) of the rotation shaft (210), then an anchoring pin (234) is inserted through the guide hole (211) to fix the centrifugal rotator (230) to a rear end of the reciprocating shaft (240), and the centrifugally movable unit (300; 300') moves the compression disc (241) to and fro along the axial direction.

5. The permanent magnet generator as claimed in claim 4, wherein the compression disc (241) provided at the front end of the reciprocating shaft (240) is elastically supported by a tension elastic body (242), or the rear end of the reciprocating shaft 240 is elastically supported at the rear end by a tension elastic body (242A) or a compression elastic body (242B) inserted into the axial bore (212) of the rotation shaft (210), and wherein the centrifugally movable unit (300) comprises:
an abutment (310) fixed to a front-side outer circumferential surface of the rotation shaft (210); and
a centrifugal pivot bar (320) having a bent bar shape and including a bent portion being hinged to an end of the abutment (310) in a state in which a bent inner side of the centrifugal pivot bar (320) is positioned to be directed to the axial direction of the rotation shaft (210) and a rear end of the centrifugal pivot bar (320) is engaged with a rear surface of the compression disc (241).

6. The permanent magnet generator as claimed in claim 4, wherein the centrifugally movable unit (300') comprises:
a revolution counter (330) configured to sense a revolution speed of the rotation shaft (240) in revolutions per minute (RPM); and
a compression disc movement control unit (340) configured to move the compression disc (241) to and fro in accordance with the sensed revolution speed.

\* \* \* \* \*